United States Patent [19]

Kawamura

[11] Patent Number: 4,738,236
[45] Date of Patent: Apr. 19, 1988

[54] COMBUSTION CHAMBER FOR INTERNAL COMBUSTION ENGINES

[75] Inventor: Hideo Kawamura, Fujisawa, Japan

[73] Assignee: Isuzu Motors Limited, Tokyo, Japan

[21] Appl. No.: 35,404

[22] Filed: Apr. 7, 1987

[30] Foreign Application Priority Data

Apr. 12, 1986 [JP] Japan ................................ 61-83231

[51] Int. Cl.⁴ .............................................. F02B 23/06
[52] U.S. Cl. ....................................... 123/276; 123/279
[58] Field of Search ........................ 123/276, 280, 279

[56] References Cited

U.S. PATENT DOCUMENTS

| | | | |
|---|---|---|---|
| 2,762,347 | 9/1956 | Seegelken | 123/276 |
| 2,832,325 | 4/1958 | Liebel | 123/276 |
| 2,858,814 | 11/1958 | Meurer | 123/276 |
| 2,865,346 | 12/1958 | Liebel | 123/276 |
| 2,921,566 | 1/1960 | Meurer | 123/276 |
| 2,975,772 | 3/1961 | Boettger | 123/276 |
| 3,469,564 | 9/1969 | Hiereth | 123/276 |
| 4,018,194 | 4/1977 | Mitchell | 123/276 |
| 4,501,239 | 2/1985 | Bauer | 123/276 |

FOREIGN PATENT DOCUMENTS

| | | |
|---|---|---|
| 1182853 | 1/1959 | France ................................ 123/276 |
| 1276938 | 12/1960 | France . |
| 749825 | 6/1956 | United Kingdom . |
| 2118244 | 10/1983 | United Kingdom . |

Primary Examiner—Ronald B. Cox
Attorney, Agent, or Firm—Cullen, Sloman, Cantor, Grauer, Scott & Rutherford

[57] ABSTRACT

According to the invention, a combustion chamber for internal combustion engines is constructed by forming a combustion chamber recessed in the head portion of a piston, and disposing therein a fuel injection nozzle means that atomizes and supplies the fuel thereinto in such a manner that the plural number of fuel mists formed by the fuel injection nozzle means will strike the inner wall of the combustion chamber at intervals at the outside of the swirl generated in the combustion chamber but adhere to the combustion chamber inner wall flowing in the direction of the swirl. Therefore, the fuel so supplied does not cool the combustion chamber inner wall excessively, and itself is heated by the heat of the inner wall as well as by the heat of the compressed air so to vaporize easily, so that favorable dispersion and distribution of the mixture gas within the combustion chamber is ensured, developing stabilized power output and sustaining favorable combustion while suppressing the exhaust of HC and NOx.

8 Claims, 2 Drawing Sheets

PRIOR ART

PRIOR ART

COMBUSTION CHAMBER FOR INTERNAL COMBUSTION ENGINES

BACKGROUND OF THE INVENTION

1. Field of the Invention

The present invention generally relates to a combustion chamber for internal combustion engines. More specifically, it involves arrangements for internal combustion engine combustion chambers by which not only high fuel economy and high power output are both obtained by controlling the amount of fuel film to be formed adhering onto the inner wall of the combustion chamber, but also white exhaust fumes and NOx are decreased.

2. Background Art

Among diesel engine designs that attempt to achieve high efficiency combustion by directly injecting fuel into a combustion chamber, there are the so-called MAN-M type engines, shown in FIG. 3, and the multi-jet type diesel engines, shown in FIGS. 4 and 5 of the drawings hereof.

In the MAN-M type engines, as shown in FIG. 3, while swirl (S) is generated in the combustion chamber (b), which is recessed deep in the piston head part (a) forming a spherical cavity, fuel mist ($F_1$) is injected thereinto from the fuel nozzle (c) so as to adhere to the combustion chamber (b) in the form of fuel film. The wall evaporation rate of the fuel film is then controlled by the swirl (S).

Thus, the MAN-M method promotes mixing of air and fuel and combustion thereof by collecting the fuel as it evaporates in the outside of the swirl (S), and is capable of lowering the combustion temperature, thereby achieving low emissions of NOx and noise. However, this method is unsatisfactory because under cold-starting conditions or when idling the engine at very cold temperatures, large amounts of bluish-white fumes and HC (hydrocarbons) are exhausted, since under such conditions, favorable wall evaporation is not attainable because the temperatures of the combustion chamber (b) wall and the combustion air are both low.

This is because: (1) the combustion chamber is not quickly heated to a temperature that will allow the fuel to evaporate and be ignited and, (2) the fuel mist, which has strong penetration due to the sole nozzle hole, further lowers the combustion chamber wall temperature to greatly limit the ability of the fuel to evaporate. Consequently, the amount of evaporated fuel is insufficient compared to the volume of the combusion chamber, and as the evaporated fuel is stirred by the swirl (S), the concentration of the air-fuel mixture gas (referred to as "mixture gas" hereinafter) within the combustion chamber becomes excessively lean, thereby aggravating combustion.

In the combustion chamber of the multi-jet type diesel engine shown in FIG. 4, on the other hand, nozzle holes (g) of the fuel injection nozzle ($c_1$) are disposed in the combustion chamber ($b_1$) of piston head part (a) so as to respectively face the inner walls (e), which are arranged so as to divide the circumference of the combustion chamber ($b_1$) more or less equally.

The arrangement shown in FIG. 4 attempts to attain combustion of high output and low fuel consumption rate by creating a premixed gas having good ignitability and combustibility by uniformly dispersing the fuel mist in the combustion chamber ($b_1$). However, this method is not entirely satisfactory, in that because the penetration of fuel mist for a given strength of swirl becomes weaker as the number of the nozzle holes increases, most of the fuel mist is mixed with that part of the air which is distributed in the force flow (D) of the swirl (S), namely the air present in the vicinity of the center of the combustion chamber ($b_1$), resulting in the formation of a rich premixed gas in that locality. This happens because the swirl (S) tends to converge toward center, away from the peripheral walls of combustion chamber ($b_1$) because of the relative configuration of the diameter of the cylinder (not shown) and the diameter of the opening of the combustion chamber ($b_1$). Therefore, the combustion mode is such that ignition takes place in the vicinity of the combustion chabmer ($b_1$) center, from which fire propagates rapidly.

Although this is advantageous in terms of the power output and the fuel economy, a problem still remains in that the rapid rise both in the combustion peak temperature and the cylinder pressure gives rise to an increase in NOx and combustion noise.

In the multi-jet type diesel engine combustion chamber (disclosed in Japanese Utility Model Laid Open No. 41229/82), shown in FIG. 5, a fuel injection nozzle ($c_2$) is disposed so as to eccentrically face the center of the combustion chamber ($b_2$), with its plural nozzle holes ($g_1$) so disposed that each of the nozzle holes ($g_1$) faces an inner wall ($e_1$) of combustion chamber ($b_2$), and a low thermal conductivity material (h) is attached to that part of the wall ($e_1$) which is on the closer side in terms of the distance between the nozzle hole ($g_1$) and the wall ($e_1$).

The arrangement of FIG. 5 described above provides fuel mist to the inner wall of the eccentric side thereof by eccentrically disposing the fuel injection nozzle with regard to the combustion chamber center, and at the same time evaporates that fuel mist by the low thermal conductivity member (h).

Thus, in the arrangement of FIG. 5, premixed gas is formed at both the inner side and the outer of the swirl (S), but a problem exists in that, owing to the eccentrically oriented injection direction, the fuel mist from the nozzle hole located at the opposite side of the eccentricity has to travel longer, resulitng in weakened penetration, so that most of that fuel mist is distributed and vaporized in the inner side of the swirl or the central area of the combustion chamber ($b_2$). This means that richer premixed gas is generated in the vicinity of the combustion chamber center as in the case of the arrangement of FIG. 4.

In yet another proposed arrangement, the combustion chamber inner wall is wholly covered with the aformentioned low thermal conductivity member so as to improve adiabatic efficiency. Such an arrangement is not favored, however, because it creates other problems. For example, the intake air is inordinately heated up due to the improved adiabatic character, and this results in either decreased suction efficiency, or the fuel is untimely ignited before it is gasified to form a proper mixture gas.

SUMMARY OF THE INVENTION

The object of the present invention is to provide a combustion chamber for internal combustion engines which is capable of attaining the following goals:

(1) to improve output performance and fuel consumption under all load conditions including the starting up of an engine; and (2) to carry out fuel evaporation and combustion while suppressing the generation of unburnt matters, such as HC and white smoke, and combustion noises and vibrations.

The aforementioned goals are attained through the following construction. In the top portion of the piston, there is provided a combustion chamber in a form of cavity recessed in the axial direction with the piston head surface as a reference plane. In such combustion chamber, there is disposed a fuel injection nozzle means, which is oriented eccentrically with regard to the axis of the combustion chamber, and which is equipped with a plural number of nozzle holes. Each of the nozzle holes is capable of atomizing and injecting the fuel, and not only faces the downstream of the swirl but is so oriented in such direction as to flow the injected fuel mist along the inner wall of the aforesaid combustion chamber.

To describe the effects achieved by this arrangement, first, each of the fuel mists thus supplied atomized by each of the plural nozzle holes of the fuel injection nozzle means is in part further pulverized upon colliding with the combustion chamber inner wall, and is evaporated instantaneously. In the meantime, the rest of the fuel mist forms a fuel film of uniform thickness that spreads itself over a wide range while flowing along the combustion chamber inner wall in the direction of the swirl as well as in the depth direction of the combustion chamber.

This fuel film is quickly evaporated from its outer surface by the heat of the compressed air and the heat of the inner wall. The fuel vapor thus generated is burned as it is mixed with air in the outside of the mainstream of the swirl (called "swirl's natural flow" hereinafter), evaporation of the fuel film is promoted upon this combustion, and combustion takes place by flame propagation.

That is to say, unlike in the conventional arrangement where the fuel is distributed in the swirl's natural flow area and on the combustion chamber wall as a consequence of the provision of only one nozzle hole, the fuel is distributed in the form of mist or vapor, positively in the swirl's natural flow area by providing multiple nozzle holes so as to increase the injection rate and to prevent the fuel mist from passing through the swirl's forced flow. Owing to this arrangement, a combustion that ensures superior power output and fuel economy while suppressing the production of white fumes, NOx, and the HC is achieved.

DESCRIPTION OF THE PREFERRED EMBODIMENTS

A preferred embodiment of the combustion chamber for internal combustion engines of this invention will now be described with reference to the attached drawings.

Figure 1:
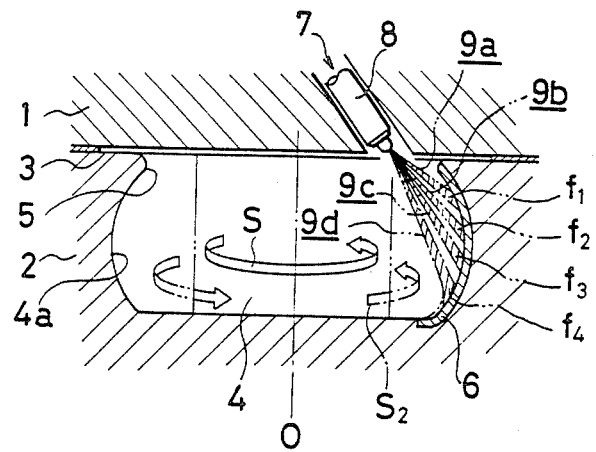
FIG. 1 is a schematic vertical sectional view showing a preferred embodiment of the combustion for internal combustion engines of the present invention.

In FIG. 1, the numeral 1 denotes the cylinder head, and 2 the piston. As shown in the figure, in the piston head portion 3 of the piston 2, there is formed a combustion chamber 4 recessed deep in the axial direction with the top surface of the piston head 3 as a reference plane, in a manner such that a vertical section of the combustion chamber 4 is a circle truncated both at the top and the bottom ends. As a consequence thereof, there is formed a lip member 5 at the top opening of the combustion chamber 4 in such a way that it appropriately protrudes radially and inwardly along the periphery of such opening.

It should be mentioned again here that the objectives of this invention are to attain high efficiency combustion with regard to power output and fuel economy while suppressing generation of HC, bluish-white fumes, and NOx for all load conditions including starting up of the engine. To achieve these objectives, a thermal insulation member means 6 and a fuel injection nozzle means 7 are provided in the afornentioned combustion chamber 4, in the following relationship.

The fuel injection nozzle means 7 is constructed in such a manner as to contain in its nozzle body 8 a needle valve (not shown), which is capable of free up-and-down motion with respect to the valve seat (not shown) provided in nozzle body 8, and so as to form at the tip of the body 8 a plurality of nozzle holes ($9a$, $9b$, $9c$, $9d$) which are opened as the needle valve is lifted.

Each of the nozzle holes $9a$–$9d$ is disposed so as to face the inner wall $4a$ of the combustion chamber 4, with each of the nozzle holes $9a$–$9d$ facing the downstream of swirl S at given intervals as well as facing the combustion chamber depth at given intervals. Here, not only the nozzle holes $9a$–$9d$ are disposed so that their distances to the inner wall $4a$ are approximately equal, but their diameters are set so that the diameter of the nozzle hole $9a$ that faces the topmost portion of the inner wall $4a$ is the smallest, with the diameters of other jet nozzles $9b$–$9d$ being progressively larger in the depth direction.

As a result of the foregoing arrangement, the fuel mist $f_1$–$f_4$ that are injected respectively from nozzle holes $9a$–$9d$ so as to impinge upon the inner wall $4a$ of the combustion chamber 4 are further pulverized by collision, and in the meantime form uniform thickness fuel films of differing diffusion areas in accordance with the diameters of the injection nozzle holes $9a$–$9d$; the larger the jet nozzle diameter, the larger the diffusion area. Thus, these fuel films flow, widening themselves in the direction of swirl as well as in the direction of depth.

As a consequence thereof, these fuel films are each formed on the inner wall $4a$, adhering thereonto, covering it widely and uniformly thickness-wise, so that the inner wall $4a$ is protected from being excessively cooled by evaporation of the fuel and is maintained at a temperature above the designated temperature.

With regard to the thermal insulation layer member 6 that is provided to stabilize the temperatures of the inner walls $4a$ facing the nozzle holes $9a$–$9d$, such layer 6 is formed integrally with the inner walls $4a$, and has an area that is large enough with a sufficient margin to cover the area of the fuel film, which is formed following the collision of the fuel mists $f_1$–$f_4$ coming from the nozzle holes $9a$–$9d$, widening itself in the directions of swirl S and of the combustion chamber depth.

Though a ceramic material is used in this embodiment, any material having a heat-resistive, corrosion-resistive, and high thermal insulation property may be used. The thermal insulation layer 6 may be formed by press forming a strip so it is adapted to the shape of the combustion chamber 4 and then soldering, welding, or cast-inserting it to the inner wall 4a, or layering it up into the desired form by a spray coating method.

The function of the internal combustion engine combustion chamber of this invention will now be described with reference to the attached drawings.

Figure 2:
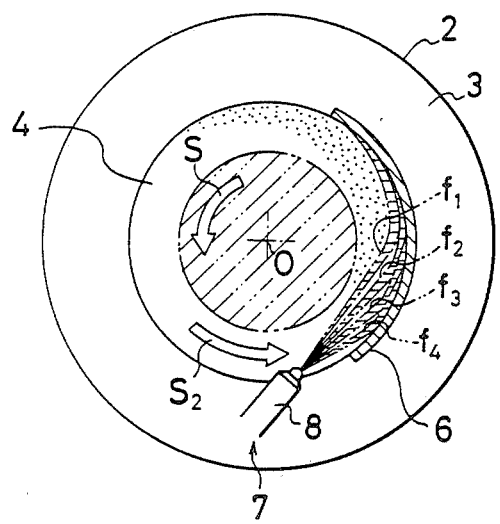
FIG. 2 is a plan view of FIG. 1.
Figure 3:
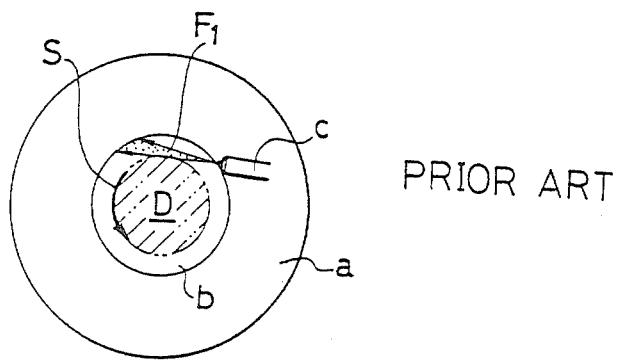
FIG. 3 is a plan view illustrating the MAN-M type engine combustion chamber.
Figure 4:
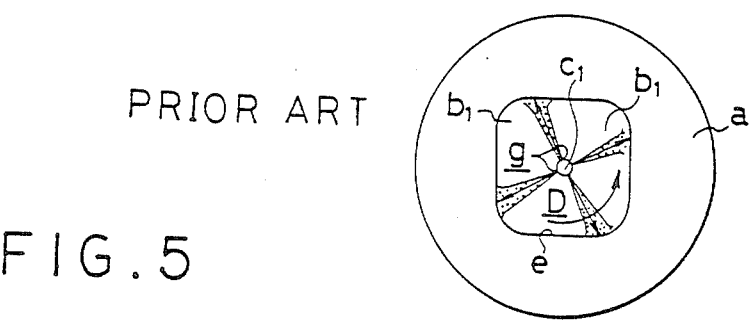
FIG. 4 is a plan view illustrating the multi-jet type diesel engine combustion chamber of the prior art.
Figure 5:
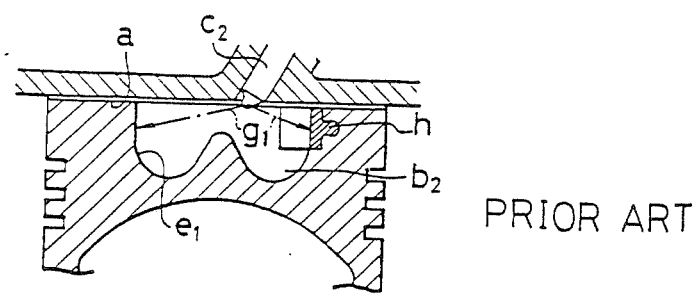
FIG. 5 is a vertical section view illustrating the multiple-jet type diesel engine combustion chamber according to the prior art.

As shown in FIGS. 1 and 2, the high temperature compressed air generated by compression of piston 2 quickly heats up the thermal insulation layer member 6 to a temperature above the fuel evaporation temperature, even when starting the engine in a very cold environment. Therefore, the fuel mists $f_1$-$f_4$ that are injected toward the insulation layer member 6 from nozzle holes $9a$-$9d$ of the fuel injection nozzle means 7 are in part further pulverized upon collision with the insulation layer member 6 and evaporates while flowing toward the downstream and outside of swirl $S_1$, namely into the natural flow $S_2$ of the swirl. In the meantime, the rest of the fuel mists $f_1$-$f_4$ adheres on the combustion chamber inner wall 4a in the form of a fuel film that wall-evaporates while flowing toward the direction of swirl S downstream and of combustion chamber 4 depth. As the travel distances of fuel mists $f_1$-$f_4$ are set approximately equal to each other, furthermore, the diffusion area of each fuel mist is proportional to the diameter of the nozzle hole from which it was injected, so that the fuel film is formed narrower in the upper part of the combustion chamber 4, widening in the direction of depth thereof.

Therefore, each fuel film in the combustion chamber 4 is vaporized quickly from its outer surface by the heat of the thermal insulation layer member 6 and of the compressed air, and is ignited and burned upon mixing with air together with aforesaid part of the fuel which has been pulverized and evaporated, while flowing on the swirl natural flow $S_2$ in the swirl downstream direction.

As the combustion energy thus liberated promotes the evaporation of the fuel film, moreover, the evaporated fuel is to spread gradually and steadily outside the swirl (the swirl's natural flow $S_2$), and combustion is performed gradually. Therefore, not only a comparatively fast combustion of good power output and fuel economy accompanied by low NOx and low noises as compared with those of the conventional MAN-M type engines is realized, but effective wall evaporation and combustion is ensured wile suppressing exhaust of white smoke and HC, even when starting up the engine in a cold environment, because the temperature of the inner walls of combustion chamber 4 is not substantially lowered by the colliding fuel mists.

I claim:

1. A combustion chamber for internal combustion engines, of the type including means for producing swirl within said combustion chamber comprising:
   a combustion chamber provided in the head portion of a piston in the form of a cavity recessed in the axial direction of said piston;
   fuel injection nozzle means disposed in said combustion chamber and positioned eccentrically with respect to the axis of the combustion chamber, said fuel injection nozzle means being arranged to atomize and supply the fuel in the form of a plurality of closely spaced fuel mists in the downstream direction of said swirl and along the inner wall of said combustion chamber so that a plurality of fuel films are formed along said inner wall of the combustion chamber; and
   a thermal insulation member in the form of a thin plate provided within said inner wall and forming a part of the wall surface said insulation member defining only a portion of said inner wall on which said plurality of fuel films are formed, said thermal insulation member and said fuel injection nozzle means being arranged so that fuel supplied by said fuel injection nozzle means impinges directly on said thermal insulation member.

2. The combustion chamber for internal combustion engines according to claim 1, wherein said inner wall of said combustion chamber is spherically recessed in the radially outward direction in a manner to form a lip member radially and along the upper opening periphery of said combustion chamber.

3. The combustion chamber for internal combustion engines according to claim 1, wherein the area of said portion of said inner wall covered by said thermal insulation member is large enough to constantly maintain the intake efficiency of the combustion chamber.

4. The combustion chamber for internal combustion engines according to claim 3, wherein the area of said portion of said inner wall is equal to or less than approximately one-third of the entire area of said inner wall.

5. The combustion chamber for internal combustion engines according to claim 1, wherein said fuel injection nozzle means includes a plurality of nozzle holes for atomizing and supplying the fuel, said nozzle holes being disposed eccentrically with respect to the center of said combustion chamber.

6. The combustion chamber for internal combustion engines according to claim 1, wherein said thermal insulation member is formed from a heat-resisting and corrosion-resisting material and defines a portion of the curved surface of the combustion chamber inner wall.

7. The combustion chamber for internal combustion engines according to claim 6, wherein said heat-resisting and corrosion-resisting material is a ceramic.

8. The combustion chamber for internal combustion engines according to claim 1, wherein said thermal insulation member is formed from a ceramic material.

* * * * *